United States Patent
Langer et al.

(10) Patent No.: US 11,378,976 B2
(45) Date of Patent: Jul. 5, 2022

(54) METHOD AND CONTROL SYSTEM FOR UTILIZING AN AUTONOMOUS VEHICLE AS SHIELD AGAINST METEOROLOGICAL PHENOMENA

(71) Applicants: Hyundai Motor Company, Seoul (KR); Kia Motors Corporation, Seoul (KR)

(72) Inventors: Ingmar Langer, Darmstadt (DE); Michael Schreiber, Frankfurt am Main (DE); Claudia Escobar Yaya, Ypsilanti, MI (US); Margaux Krause, Pinckney, MI (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 616 days.

(21) Appl. No.: 16/375,009

(22) Filed: Apr. 4, 2019

(65) Prior Publication Data

US 2020/0166946 A1    May 28, 2020

(30) Foreign Application Priority Data

Nov. 27, 2018  (DE) ........................ 10-2018-220362.8

(51) Int. Cl.
| | | |
|---|---|---|
| *G05D 1/02* | (2020.01) | |
| *E01H 5/00* | (2006.01) | |
| *B60S 1/62* | (2006.01) | |

(52) U.S. Cl.
CPC .............. *G05D 1/0276* (2013.01); *B60S 1/62* (2013.01); *E01H 5/00* (2013.01); *G05D 2201/0213* (2013.01)

(58) Field of Classification Search
CPC ......... G05D 1/0276; G05D 2201/0213; G05D 1/02; G05D 1/0088; G05D 1/021; B60S 1/62; B60S 1/56; E01H 5/00; B60W 50/00; B60W 40/00; B60W 2050/0043; B60W 40/02; B60W 30/14; B60W 2050/009; B60W 2420/00; B60W 2552/00; B60W 2555/20; B60W 2555/60; B60W 2556/45; B60Y 2300/14
See application file for complete search history.

(56) References Cited

U.S. PATENT DOCUMENTS

| | | | |
|---|---|---|---|
| 6,421,600 B1 * | 7/2002 | Ross | ....................... B60L 50/51 701/117 |
| 2015/0217754 A1 | 8/2015 | MacNeille et al. | |
| 2016/0288635 A1 * | 10/2016 | Morazan | ............... E04H 15/322 |
| 2018/0290528 A1 * | 10/2018 | Guma | ...................... B60J 11/04 |
| 2018/0291579 A1 * | 10/2018 | Gharabegian | ........... E01H 5/106 |

* cited by examiner

*Primary Examiner* — Rodney A Butler
(74) *Attorney, Agent, or Firm* — Fox Rothschild LLP

(57) ABSTRACT

A method and control system for utilizing an autonomous vehicle as shield against meteorological phenomena above a drivable surface area are provided. The method includes determining if the drivable surface area is to be shielded against the meteorological phenomenon and autonomously driving the vehicle over the drivable surface area to at least partially cover the drivable surface area from the meteorological phenomenon. Additionally, the method includes determining if the drivable surface area is to be uncovered and autonomously driving the vehicle away from the drivable surface area to uncover the drivable surface area.

6 Claims, 5 Drawing Sheets

METHOD AND CONTROL SYSTEM FOR UTILIZING AN AUTONOMOUS VEHICLE AS SHIELD AGAINST METEOROLOGICAL PHENOMENA

CROSS-REFERENCE TO RELATED APPLICATION(S)

This application claims the benefit of priority to German Patent Application No. 10-2018-220362.8, filed on Nov. 27, 2018, the disclosure of which is hereby incorporated in its entirety by reference.

TECHNICAL FIELD

The present invention pertains to a method and a control system for utilizing an autonomous vehicle as shield against meteorological phenomena, and more particularly, toe a method and control system that utilize an autonomous vehicle as a shield snow.

BACKGROUND

Current motor vehicles are increasingly connected with sensors and telematics to implement advanced autonomous driving functionalities. For example, vehicles may include multiple sensors and various techniques for acquiring data from the environment, e.g. to provide accurate detection of other vehicles, pedestrians, of the road ahead and/or behind, of the weather and so on. Typical technologies that are utilized for this purpose include radar, laser, lidar, infrared, ultrasound, cameras, stereo vision, computer vision, odometry, accelerometers, gyroscopes, GPS, and so on. To produce a more consistent, accurate and useful view of the environment, a variety of such sensors may be mounted on the vehicle and the information from these sensors may be combined within a sensor system.

In many regions of the world snow is a common weather phenomenon that often poses a significant burden on traffic management and road safety. For example, snow tends to make sidewalks slippery for pedestrians and vehicles. In some countries house owners have to ensure a snow free-sidewalk in front of their houses, which means that they have to either clear the sidewalk themselves or hire a professional removal service. Snow can further make it difficult to exit an underground garage, in particular in case of high inclinations at the entrance/exit.

A developed technology in the related art teaches a system that includes a processor configured to receive parking space environmental characteristics from a vehicle parked in a parking space. The processor is further configured to download weather data for an area in which the parking space is located, covering a time duration for which the vehicle was parked. The weather data is then correlated to the received environmental characteristics to generate a parking space environment profile for the duration of time and update a parking space model based on the environment profile. However, there remains a need to find solutions for shielding selected areas against meteorological phenomena in an effortless and efficient manner. In particular, there remains a need to find solutions for maintaining these types of areas free of snow.

SUMMARY

Accordingly, the present invention provides a method a method for utilizing an autonomous vehicle as shield against meteorological phenomena, in particular against snow.

According to one aspect of the present invention, the method may include determining if a drivable surface area is to be shielded against a meteorological phenomenon; autonomously driving the vehicle over the drivable surface area such that the vehicle at least partially covers the drivable surface area against the meteorological phenomenon; determining if the drivable surface area is to be uncovered; and autonomously driving the vehicle away from the drivable surface area to uncover the drivable surface area.

According to another aspect of the invention, a control system for utilizing an autonomous vehicle as shield against meteorological phenomena, in particular against snow, may include an autonomous driving unit configured to autonomously drive the vehicle; and a decision unit configured to determine if the drivable surface area is to be shielded against a meteorological phenomenon and in that case prompt the autonomous driving unit to drive the vehicle over the drivable surface area such that the vehicle at least partially covers the drivable surface area against the meteorological phenomenon, and configured to determine if the drivable surface area is to be uncovered and in that case prompt the autonomous driving unit to drive the vehicle away from the drivable surface area to uncover the drivable surface area.

According to yet another aspect of the invention, a vehicle may include a control system according to the invention. In particular, the present invention employs autonomous vehicles as shields against meteorological phenomena, in particular against snow, by parking autonomous vehicles on particular areas to keep these areas free of snow, hail, wind and so on. For example, autonomous vehicles (at least temporarily) not being used may be steered above these areas when snow fall is imminent and/or has started. The vehicles may be removed when the snow fall has finished. In the meantime, the snow will aggregate on the vehicle and thus will not affect the ground below the vehicle.

Accordingly, the surface area covered by the vehicle will remain free of snow in a simplified manner. In one particular example, autonomous vehicles parking on a parking lot or parking bay adjacent to a sidewalk may be (autonomously) moved from the parking lot onto the sidewalk to keep snow away from the sidewalk. Other areas of interest include house entrances and/or exits, inclinations of (underground) garages etc. When several autonomous vehicles are available, the one covering a largest surface area may be used, e.g. a truck and/or an SUV or the like. Additionally, several vehicles may be parked collectively or consecutively as close together as possible (e.g. bumper-on-bumper or side-by-side) to generate a larger coverage with minimal gaps in-between vehicles. Vehicles may even be rented and/or shared to provide a snow shield function according to the invention, e.g. unused car-sharing vehicles may be employed to keep sidewalks free of snow throughout a city.

The invention may help to keep critical areas free of snow in winter in a time and cost efficient manner and road safety is also increased on a general level. In addition, the invention may be employed for further applications, e.g. to keep particular road surface markings free of snow. In principle, the invention may be used to keep drivable surface areas free of snow, and also, for example, to shield particular areas against rain, sun, hail, wind or other meteorological phenomena. The invention enables to implement integrated shield functions in rented and/or shared vehicles against various weather influences.

According to an exemplary embodiment of the invention, the method may further include determining, by a determination unit of the vehicle, if a meteorological phenomenon is occurring within the drivable surface area and/or if the meteorological phenomenon is imminent within the drivable surface area. Accordingly, the decision unit may be configured to prompt an autonomous driving unit to drive the vehicle over the drivable surface area. The method may further include determining, by the determination unit, if the meteorological phenomenon has stopped in the drivable surface area. Accordingly, the decision unit may be configured to prompt the autonomous driving unit to drive the vehicle away from the drivable surface area. A determination unit may be used to determine if the meteorological phenomenon is taking place within the drivable surface area and/or if the meteorological phenomenon is imminent within the drivable surface area.

In one particular example, the determination unit may be configured to determine if it is snowing in the drivable surface area and/or if snow fall is imminent within the drivable surface area. The determination unit may also be configured to determine if snow fall has stopped within the drivable surface area. However, alternatively or additionally, it may also be possible that a driver provides a command to activate the "snow shield" function of the vehicle, e.g. via a smartphone and/or a driver interface of the vehicle, regardless whether snow and or another meteorological phenomenon is imminent and/or occurring. Similarly, the driver may access the vehicle via remote control or similar and request the vehicle to drive back to an original parking position, e.g. via smartphone.

According to an exemplary embodiment of the invention, the method may further include determining, by the determination unit, if another vehicle and/or a traffic participant approaches the drivable surface area and/or communicates an intention to cross the drivable surface area. Accordingly, the determination unit may be configured to determine if another vehicle and/or a traffic participant approaches the drivable surface area and/or communicates an intention to cross the drivable surface area. When another vehicle and/or traffic participant intends to pass the drivable surface area, the decision unit may be configured to prompt the autonomous driving unit to partially or completely drive the vehicle away from the drivable surface area. When the other vehicle and/or traffic participant has passed through the drivable surface area, the vehicle may be driven back above the drivable surface area.

For example, when pedestrians intend to pass the drivable surface area covered by the vehicle, e.g. a sidewalk, the vehicle may be moved away autonomously thereby partially or fully uncovering the drivable surface area. It will be clear to the person of skill that the vehicle may be positioned already initially such as to cover only a part of the drivable surface area so that pedestrians are already able to pass the vehicle without any subsequent repositioning of the vehicle.

According to an exemplary embodiment of the invention, the determination unit may utilize a sensor system configured to detect a meteorological phenomenon, other vehicles and/or traffic participants. Meteorological phenomena may include snow, hail, rain, sun, wind and so on. For example, snow may be detected by in-vehicle sensors like cameras, radar, lidar, rain sensors (e.g. in combination with a temperature sensor). Another vehicle and/or traffic participant, e.g. a pedestrian, may be detected by a camera, radar, lidar, microphone (e.g. by detection of a walking sound, voices etc.) and/or by a system configured to sense an approaching smartphone or similar.

However, the determination unit may further utilize meteorological data and/or environmental data. Additionally, the determination unit may utilize vehicle-to-vehicle communication and/or environment-to-vehicle communication. Accordingly, even sensor systems of other vehicles and/or from the general environment may be utilized to detect meteorological phenomena, other vehicles and/or other traffic participants, which information may then be communicated to the present vehicle. In general, the determination unit may be configured to determine other triggers and/or causes that make it necessary to move the vehicle partially or fully away from the drivable surface area. For example, a door may need to be opened directly adjacent to the vehicle. Additionally, in-vehicle sensors such as ultrasonic sensors may be used to detect the corresponding occurrences.

According to an exemplary embodiment of the invention, the sensor system may further be configured to determine curb heights within the drivable surface area. Thus, according to an exemplary embodiment of the invention, the determination unit may be configured to determine if a curb height is greater than a predefined threshold. For example, the vehicle may be moved onto the drivable surface area without any damage, e.g. in case the curb is very high. A curb threshold may be defined based on the chassis clearance of the vehicle. Movement of the vehicle over the curb may be prohibited when the determined curb height is greater than the threshold value.

According to an exemplary embodiment of the invention, the vehicle may comprise a sensor system configured to detect the meteorological phenomenon, in particular snow, vehicles and/or traffic participants. The sensor system may be configured to determine curb heights within the drivable surface area. The sensor system may be maintained snow free by heating the sensor system using a heating system of the vehicle. The sensor system may further be maintained snow free by cleaning the sensor system by a cleaning device of the vehicle. To ensure proper sensing functionality of the respective sensors while snow is falling the relevant sensors (e.g. camera sensors) should be maintained free of snow. Several possible solutions are provided by the invention to keep sensors snow free. For example, the sensors and/or an area around the sensors may be heated to melt any snow that is falling onto the sensors and potentially blocking them.

Similarly, cleaning devices such as windshield wipers and on the like may be utilized to clean an area around and/or in front of the sensors. Further options to maintain the sensors free of snow include specific coatings covering the sensor areas, which are configured to keep off any snow. Another option includes placement of the sensors in dedicated areas, into which snow cannot fall and/or where snow cannot stick onto the vehicle, i.e. in which the sensors are thus protected against snow due to the sensor arrangement.

According to an exemplary embodiment of the invention, the decision unit may be configured to consider prioritization information of the vehicle including tire quality, tire type, type of drive, fuel level, battery level and/or coverage area and so on. When several autonomous vehicles are available in the same area, the vehicles with a highest prioritization level may be utilized first. The prioritization level may be based on available prioritization information of the vehicles. For example, vehicles with winter/snow tires, all-wheel drives and/or larger tread depth may be preferred. Alternatively or additionally, the fuel and/or battery level may be considered when a decision between different vehicles is made. Furthermore, the vehicles covering a largest surface area may be used, e.g. a truck and/or an SUV or the like. The coverage area of the respective vehicle may be matched with the size of the drivable surface area.

Moreover, according to an exemplary embodiment of the invention, the drivable surface area may include a sidewalk, a building entrance/exit area, a parking area and/or a garage/carport entrance/exit area. For example, an autonomous vehicle may be driven from a parallel parking slot to a sidewalk/pavement to cover the sidewalk against snow. In another example, autonomous vehicles may be driven forward or backward from a parking bay perpendicular onto a sidewalk. In yet another example, an autonomous vehicle parked in a garage and/or a carport may be moved out of the garage/carport and parked on a sidewalk, e.g. in front of an entrance/exit of a building. In yet another example, an autonomous vehicle may be moved from an underground garage onto a sidewalk in front of the respective building or onto an inclined exit/entrance of the garage. In this particular example, the vehicle may be used to cover the entrance/exit of the garage snow free.

The invention will be explained in greater detail with reference to exemplary embodiments depicted in the drawings as appended.

BRIEF DESCRIPTION OF THE DRAWINGS

The accompanying drawings are included to provide a further understanding of the present invention and are incorporated in and constitute a part of this specification. The drawings illustrate the exemplary embodiments of the present invention and together with the description serve to explain the principles of the invention. Other exemplary embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

Figure 1:
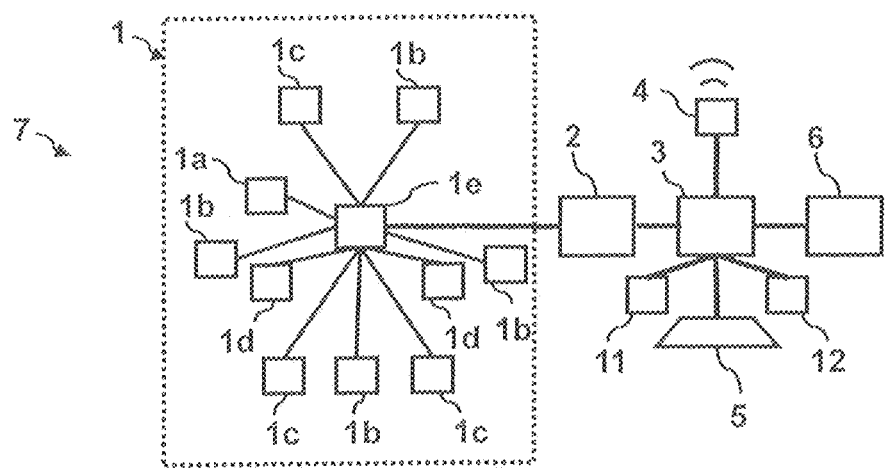
FIG. 1 schematically depicts a control system for utilizing an autonomous vehicle as snow shield above a drivable surface area according to an exemplary embodiment of the present invention.

Although specific exemplary embodiments are illustrated and described herein, it will be appreciated by those of ordinary skill in the art that a variety of alternate and/or equivalent implementations may be substituted for the specific exemplary embodiments shown and described without departing from the scope of the present invention. Generally, this application is intended to cover any adaptations or variations of the specific exemplary embodiments discussed herein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

However, vehicles according to the invention additionally comprise combinations of motorized and non-motorized vehicles, in particular trailers or similar that are towed by a powered vehicle. For example, a powered vehicle may tow an unpowered trailer autonomously onto the drivable surface area in order to shield the area from snow. Subsequently, the vehicle may decouple the trailer and leave it on the drivable surface area. Later on, e.g. after the snow fall, the vehicle may return, recouple to the trailer and move it away. Thus, in that development of the invention, a trailer may serve as a snow shield in combination with a powered vehicle capable of repositioning the trailer.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 2:
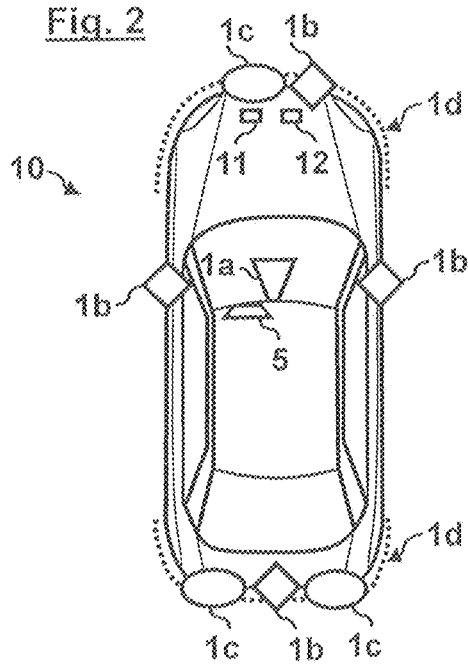
FIG. 2 schematically shows a vehicle comprising the control system of FIG. 1 according to an exemplary embodiment of the present invention.
Figure 3:
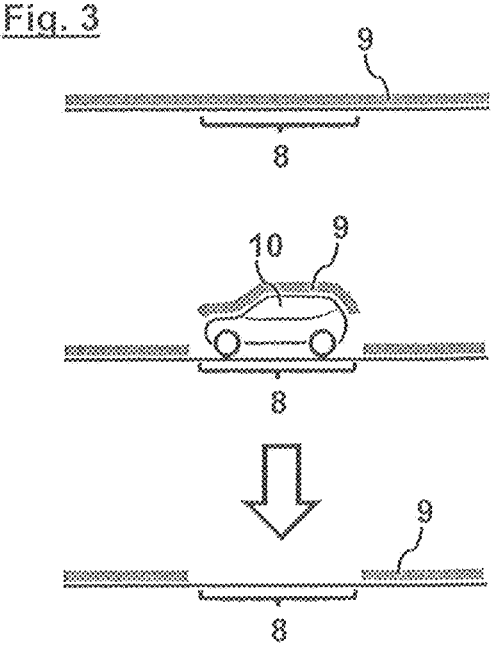
FIG. 3 depicts a surface area during snow fall with and without the invention according to an exemplary embodiment of the present invention.
Figure 4:
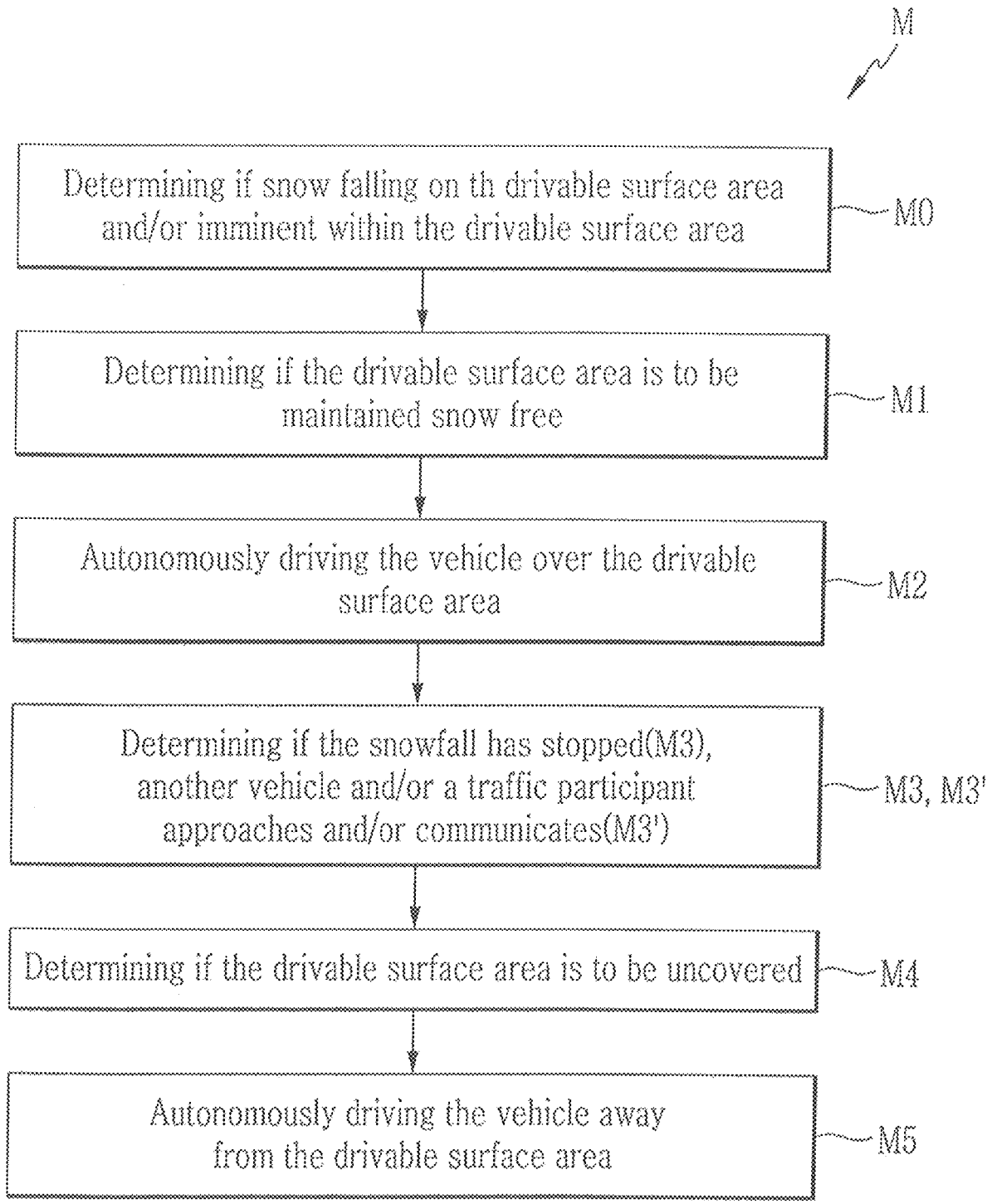
FIG. 4 shows a flow diagram of a method for utilizing an autonomous vehicle as snow shield using the control system of FIG. 1 according to an exemplary embodiment of the present invention.

FIG. 1 schematically depicts a control system 7 for utilizing an autonomous vehicle 10, e.g. the one shown in FIG. 2, as snow shield above a drivable surface area 8 according to an exemplary embodiment of the invention. FIG. 3 depicts a surface area 8 during snow fall with and without the invention. A respective method M for utilizing the autonomous vehicle 10 of FIG. 2 as snow shield using the control system of FIG. 1 is shown in FIG. 4. However, it will be clear to the person of skill that the control system 7 and the method M may be configured in other exemplary embodiments to shield the drivable surface area 8 against other meteorological phenomena besides snow including but not limited to rain, hail, sun, wind etc.

Particularly, the control system 7 of the vehicle 10 may include a sensor system 1 configured to detect falling snow 9 at least in the drivable surface area 8. However, it will be clear to the person of skill that the sensor system 1 may be configured to detect falling snow 9 in a sensing area greater than the drivable surface area 8. The sensor system 1 may further be configured to detect other vehicles and traffic participants like pedestrians and so on. Accordingly, the sensor system 1 may include a variety of different sensor technologies as they are utilized in modern motor vehicles, in particular in assisted and/or autonomous driving systems.

The particular example of a sensor system 1 shown in FIGS. 1 and 2 may include a front camera 1a and a 360°-view camera system comprising several individual cameras 1b arranged at several positions over the vehicle 10. The sensor system 1 may further include several radars 1c as well as ultrasonic sensors 1d. However, the person of skill may provide the motor vehicle 10 with other sensors depending on the particular application at hand. Furthermore, different sensor technologies and arrangements may be employed, e.g. lidars, laser scanners, temperature sensors, infrared sensors etc. The various sensors 1a-d may be communicatively connected (e.g. in parallel) to a sensor control 1e of the sensor system 1. The depicted connections are to be understood in a purely schematic way.

The control system 7 may further include a determination unit 2 configured to determine if snow is falling on the drivable surface area 8 and/or if snow fall is imminent within the drivable surface area 8. The determination unit 2 may also be configured to determine if snow fall has ended. Accordingly, the determination unit 2 may be coupled with the sensor control 1e of the sensor system 1 and configured to analyze information recorded by the sensor system 1. Snow 9 may be detected, for example, by the cameras 1a, 1b and/or the radars 1c of the vehicle 10. Notably, the determination unit 2 may be operated by a controller within the vehicle.

Additionally, the determination unit 2 may be configured to determine if at least one of another vehicle and a traffic participant approaches the drivable surface area 8 and/or communicates an intention to cross the drivable surface area 8. This may be determined using the cameras 1a, 1b and/or the radars 1c of the sensor system 1 of the vehicle 10. However, in addition, the determination unit 2 may utilize meteorological and/or environmental data provided via a communication device 4, which is communicatively coupled to the determination unit 2. The determination unit 2 may also be configured to communicate with other vehicles and/or the environment via the communication device 4 to request and/or receive information regarding the snow situation as well as on approaching vehicles and or traffic participants.

The determination unit 2 may be configured to determine if a curb height is greater than a predefined threshold to avoid damage to the vehicle 10 during a potential repositioning process (see below). The sensor system 1 may accordingly be configured to determine curb heights within the drivable surface area 8. The ultrasonic sensors 1d of the sensor system 1 may be used for example to determine the curb heights.

The control system 7 may further includes an autonomous driving unit 6 configured to autonomously drive the vehicle 10 and a decision unit 3 configured to determine if the drivable surface area 8 is to be maintained snow free. The autonomous driving unit 6 and the decision unit 3 may also be operated by the controller. Particularly, the decision unit 3 may be configured to prompt the autonomous driving unit 6 to drive the vehicle 10 over the drivable surface area 8 to at least partially cover the drivable surface area 8 from snow 9. The decision unit 3 may further be configured to determine if the drivable surface area 8 is to be uncovered, e.g. in case the shielding function is no longer necessary as the snow fall has ended. The decision unit 3 may then be configured to prompt the autonomous driving unit 6 to drive the vehicle 10 away from the drivable surface area 8 to uncover the drivable surface area 8.

Moreover, the control system 7 may include a driver interface 5 configured to display relevant information for the driver and to receive input from the driver, e.g. in case the driver wants to take over control of the vehicle 10. The determination unit 2, the decision unit 3, the communication device 4, the autonomous driving unit 6 as well as the other components of the control system 7 may be part of a telematics and/or computing system of the motor vehicle 10 for autonomous driving.

Furthermore, the control system 7 may include a heating system 11 and a cleaning system 12, both being configured to remove snow 9 from the vehicle 10, in particular from the sensor system 1. FIG. 3 demonstrates the basic principle of the control system 7 according to FIG. 1. Without using the control system 7, a drivable surface area 8 may be covered by snow 9 during snowfall (top of FIG. 3). Depending on where the drivable surface area 8 is situated this may be considered unfavorable. For example, when the drivable surface area 8 covers and/or is part of a sidewalk 8a (FIG. 5) the sidewalk 8a may become slippery due to the falling snow.

However, when a vehicle 10 being equipped with the control system 7 detects that snow 9 is falling onto the drivable surface area 8, the vehicle 10 may be configured to autonomously drive at least partially over the drivable surface area 8 to shield the area from the falling snow 9 (middle of FIG. 3). After the snowfall has ceased, the vehicle 10 may be configured to autonomously drive back to an original position, thus leaving the drivable surface area 8 free from any snow 9 (bottom in FIG. 3). For example, any vehicle(s) 10 parked adjacent or proximate to the drivable surface area 8 may be used to cover the drivable surface area 8.

The corresponding method M of FIG. 4 may include under M0 determining, by the determination unit 2, if snow is falling on the drivable surface area 8 and/or if snowfall is imminent within the drivable surface area 8. The method M may further include under M1 determining, by the decision unit 3, if the drivable surface area 8 is to be maintained snow free and under M2, autonomously driving, by the autonomous driving unit 6, the vehicle 10 over the drivable surface area 8 to at least partially covers the drivable surface area 8 from snow 9 in response to determining that the drivable surface area 8 is to be maintained snow free.

The method M may further include under M3 determining, by the determination unit 2, if the snowfall has stopped on the drivable surface area 8 and under M3' determining, by the determination unit 2, if another vehicle and/or a traffic participant approaches the drivable surface area 8 and/or communicates an intention to cross the drivable surface area 8. In both cases, the method M may further include under M4 determining, by the decision unit 3, if the drivable surface area 8 is to be uncovered and under M5 autonomously driving, by the autonomous driving unit 6, the vehicle 10 away from the drivable surface area 8 to uncover the drivable surface area.

Figure 5:
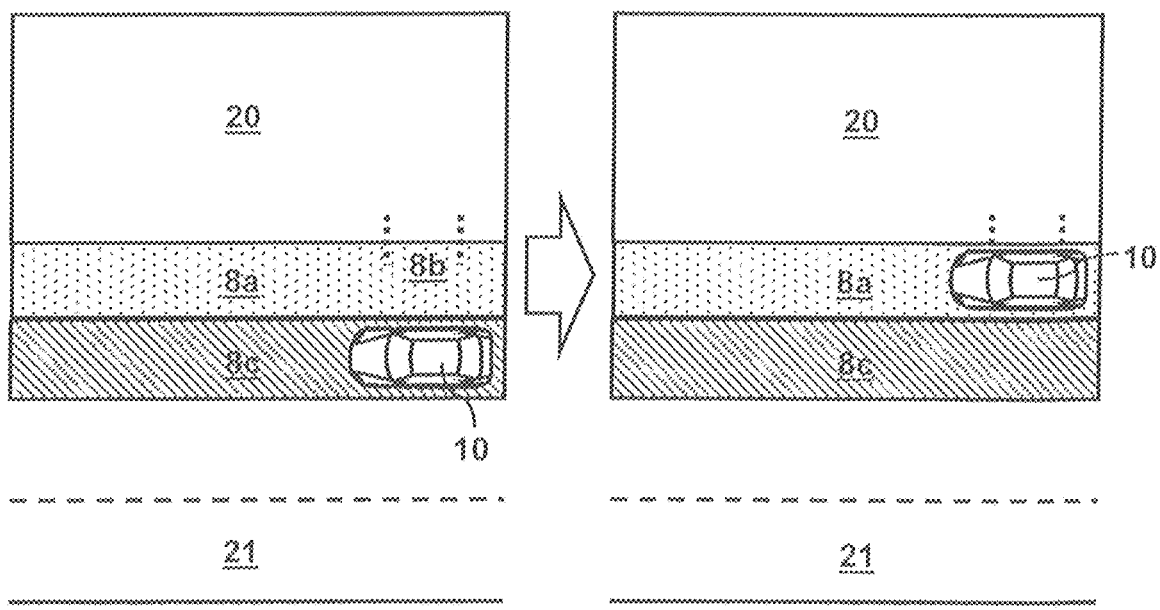
FIGS. 5 to 10 show various exemplary applications of the system and method of FIGS. 1 to 4 according to an exemplary embodiment of the present invention.

FIGS. 5 to 10 show various exemplary applications of the system and method of FIGS. 1 to 4. In the example of FIG. 5, an autonomous vehicle 10 is parking in a parking area 8c, which is oriented parallel and adjacent to a road 21 on the a first side and a sidewalk or pavement 8a on a second side in front of a building 20, the latter having a building entrance/exit area 8b (left side in FIG. 5). When snow is detected by the vehicle 10, the vehicle 10 may be autonomously steered from the parking area 8c to the sidewalk 8a, in particular the building entrance/exit area 8b, which is to be maintained snow free (right side of FIG. 5).

Figure 7:
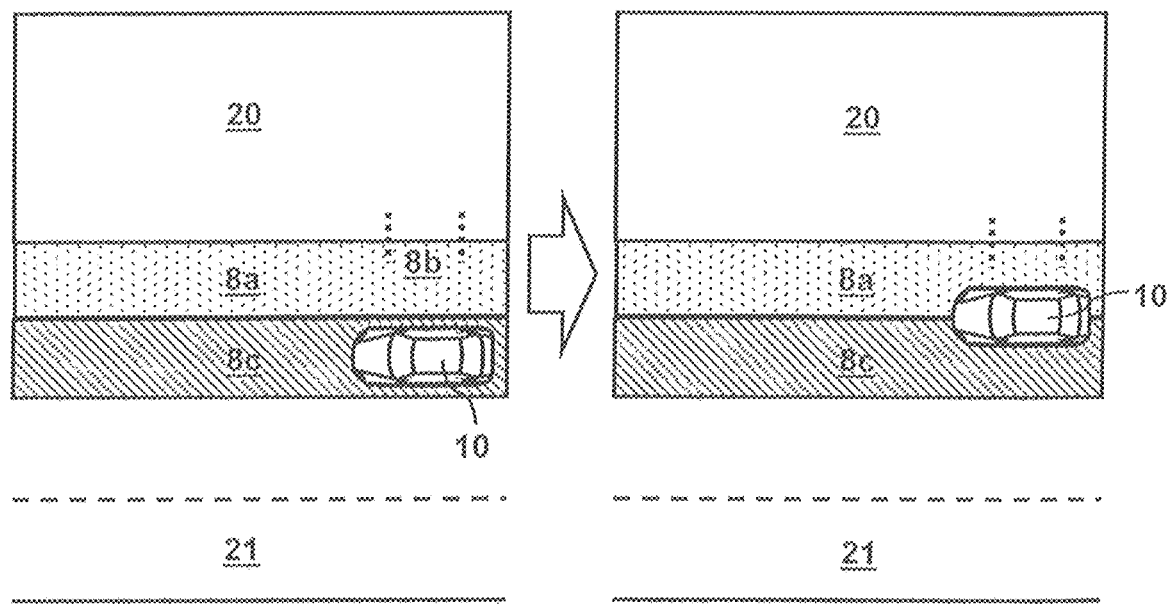
Figure 8:
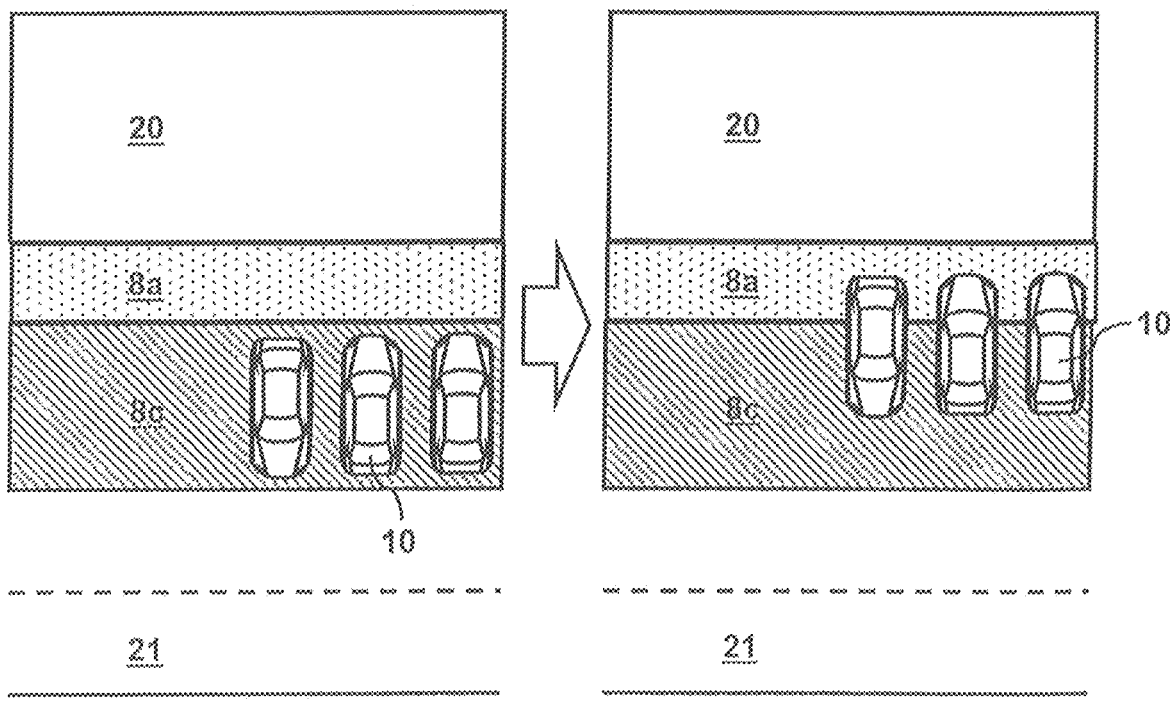

In particular, the vehicle 10 may be positioned such that the building entrance/exit area 8b is covered by the vehicle 10 from snow, and thus, the building entrance/exit area 8b will stay snow free during any further snow fall. Prior to and/or during the repositioning maneuver, the determination unit 2 may be configured to detect if the curb height is less than a predefined threshold to avoid any damage to the vehicle 10. If another vehicle and/or a pedestrian or other traffic participant intends to pass the building entrance/exit area 8b in the meantime, the vehicle 10 may be automatically driven back to an original position or another parking position in the parking area 8c and/or on the sidewalk 8a. FIG. 7 shows an alternative example, in which the vehicle 10 is only positioned such as to partially cover the building entrance/exit area 8b while its left side still remains in the parking area 8c. This scenario allows pedestrians to pass more easily.

Figure 6:
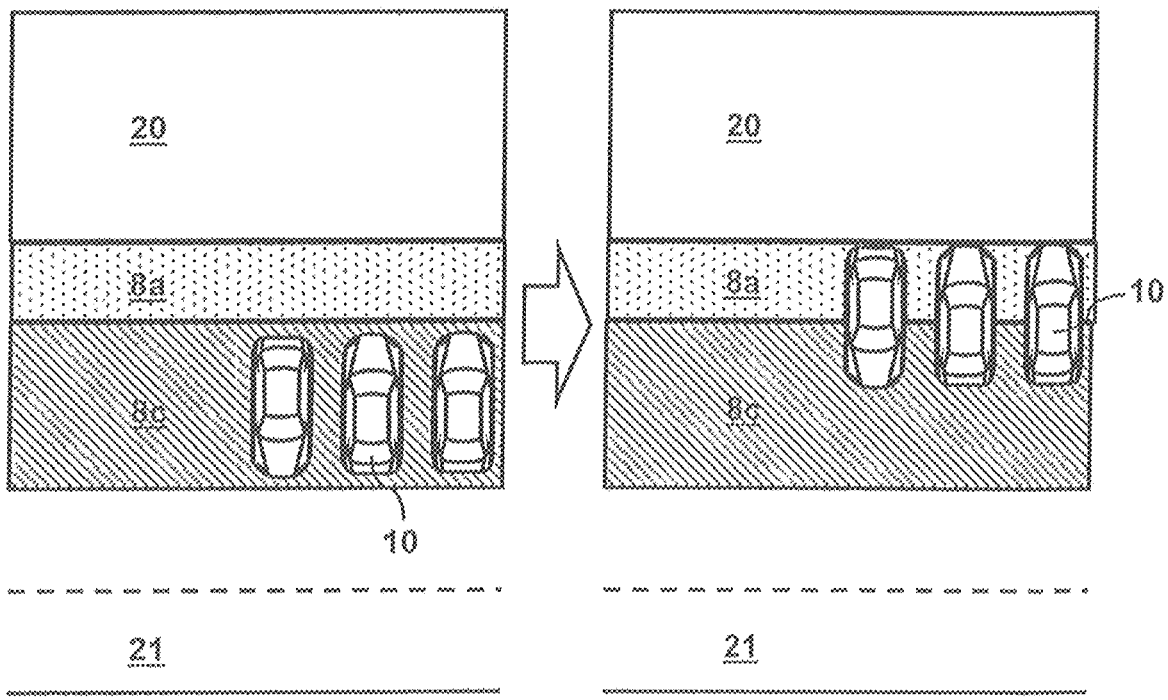

FIG. 6 shows a corresponding example for a bay parking scenario, in which several autonomous vehicles 10 are parking with an orientation perpendicular to a sidewalk 8a. In this example, the vehicles 10 may move backward or forward to cover the sidewalk 8a from snow (right side of FIG. 6). In this parking orientation, the vehicles 10 requires no additional room to maneuver contrary to the example of FIG. 5 where the vehicle 10 requires space in the front and/or back to be repositioned.

Alternatively and similar to FIG. 7, the vehicles 10 may be moved only partially onto the sidewalk 8a (FIG. 8) to leave space for pedestrians on the sidewalk 8a. It will be clear to the person of skill that several repositioning scenarios are possible, in which one or several vehicles 10 are repositioned individually or collectively. The vehicles 10 may be positioned as close together as possible, e.g. bumper-on-bumper or side-by-side, to generate a larger coverage with minimal gaps in-between vehicles 10. Furthermore, only the largest autonomous vehicles 10 available in the vicinity may be used, e.g. a truck and/or an SUV or the like.

Figure 9:
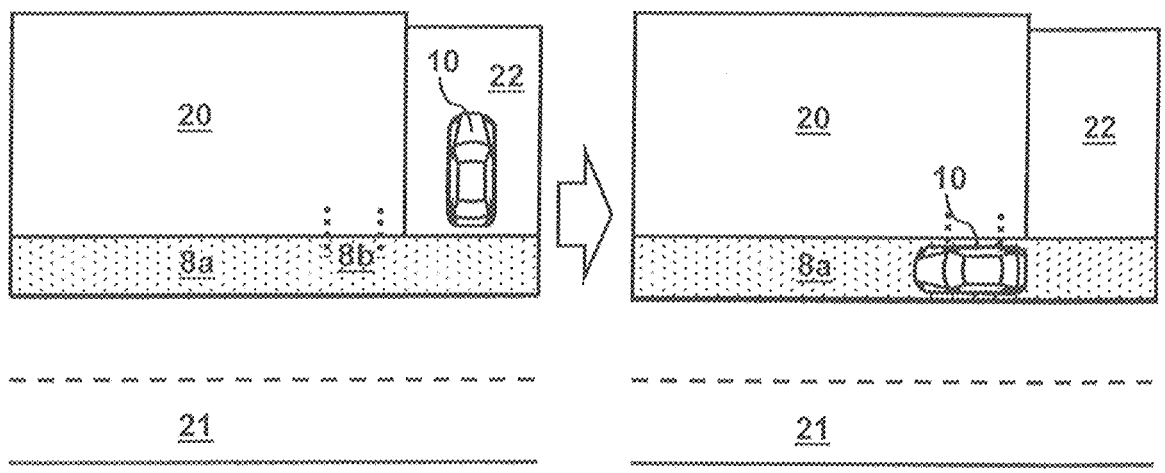

FIG. 9 shows an example, in which an autonomous vehicle 10 is parked inside a garage/carport 22 of a building 20. When the vehicle 10 is required as snow shield, the vehicle 10 may be moved out of the garage 22 onto the sidewalk 8a, e.g. inside a building entrance/exit area 8b. Also in this example, curb height determination may be used to minimize the risk of damage to the vehicle 10 during the repositioning procedure. After the snow fall has ended, the vehicle 10 may be moved back into the garage 22. Particularly, a dedicated sink and/or drain may be provided inside the garage 22, which drains any water from melting snow in a controlled manner.

Figure 10:
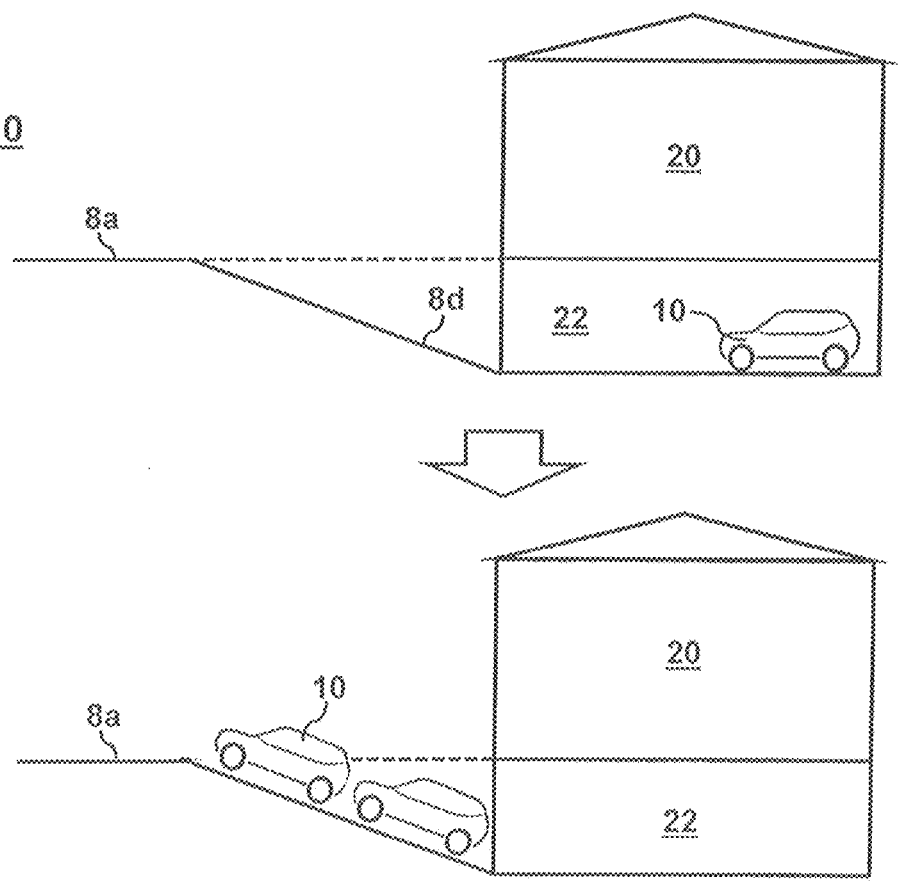

FIG. 10 is an example for an underground garage 22 beneath a building 20, which has a garage entrance/exit 8d with relatively steep inclination. Hence, it is particularly important in this example that the garage entrance/exit 8d stays free of snow. Accordingly, several autonomous vehicles 10 from the garage 22 and or the outside, e.g. a parking area 8a, may be repositioned to cover the inclination of the garage entrance/exit 8d during snow fall. As in the example of FIG. 9, a sink and/or drain may be provided in the garage 22 to channel off any meltwater. In one exemplary approach, those vehicles 10 may be employed for this purpose that have been parking in the garage 22 for a longest parking time, i.e. vehicles 10 being used less frequently than others.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The exemplary embodiments were chosen and described in order to best explain the principles of the invention and its practical applications, to thereby enable others skilled in the art to best utilize the invention and various exemplary embodiments with various modifications as are suited to the particular use contemplated. Many other examples will be apparent to one skilled in the art upon reviewing the above specification.

REFERENCE LIST 1 sensor system
1a, 1b camera
1c radar
1d ultrasonic sensor
1e sensor control
2 determination unit
3 decision unit
4 communication device
5 driver interface
6 autonomous driving unit
7 control system
8 drivable surface area
8a sidewalk
8b building entrance/exit area
8c parking area
8d garage/carport entrance/exit
9 snow
10 vehicle
11 heating system
12 cleaning system
20 building
21 road
22 garage/carport
M method
M0-M5 method steps

What is claimed is:

1. A method for utilizing an autonomous vehicle as a shield from meteorological phenomena above a drivable surface area, comprising:
   determining, by a controller of the vehicle, if the drivable surface area is to be shielded from a meteorological phenomenon;
   autonomously driving, by the controller, the vehicle over the drivable surface area to at least partially cover the drivable surface area against the meteorological phenomenon;
   determining, by the controller, if the drivable surface area is to be uncovered;

autonomously driving, by the controller, the vehicle away from the drivable surface area to uncover the drivable surface area;

determining, by the controller, if the meteorological phenomenon is occurring within the drivable surface area and if the meteorological phenomenon is imminent within the drivable surface area;

determining, by the controller, if the meteorological phenomenon has stopped in the drivable surface area; and determining, by the controller, if at least one of another vehicle and a traffic participant approaches the drivable surface area or communicates an intention to cross the drivable surface area, wherein the determination unit utilizes at least one of:
  a sensor system configured to detect at least one of a meteorological phenomenon, other vehicles, and traffic participants;
  meteorological data;
  environmental data;
  vehicle-to-vehicle communication; and
  environment-to-vehicle communication, wherein the sensor system is configured to detect curb heights within the drivable surface area, and wherein the sensor system is maintained snow free by at least one of the following:
  heating the sensor system using a heating system of the vehicle; and
  cleaning the sensor system using a cleaning device of the vehicle.

2. The method according to claim 1, wherein the controller is configured to consider prioritization information of the vehicle including at least one selected from the group consisting of: tire quality, tire type, type of drive, fuel level, battery level, and coverage area.

3. The method according to claim 2, wherein the drivable surface area includes at least one selected from the group consisting of: a sidewalk, a building entrance/exit area, a parking area, and a garage/carport entrance/exit area.

4. A control system for utilizing an autonomous vehicle as a shield from meteorological phenomena, above a drivable surface area, comprising:
  an autonomous driving unit configured to autonomously drive the vehicle;
  a controller configured to determine if the drivable surface area is to be shielded from a meteorological phenomenon and prompt the autonomous driving unit to drive the vehicle over the drivable surface area to at least partially cover the drivable surface area against the meteorological phenomenon; and configured to determine if the drivable surface area is to be uncovered and prompt the autonomous driving unit to drive the vehicle away from the drivable surface area to uncover the drivable surface area; and
  a determination unit configured to determine if the meteorological phenomenon is occurring within the drivable surface area and if the meteorological phenomenon is imminent within the drivable surface area, wherein the determination unit is configured to determine if at least one of another vehicle and a traffic participant approaches the drivable surface area or communicates an intention to cross the drivable surface area, wherein the determination unit is configured to utilize at least one of:
  a sensor system configured to detect at least one of a meteorological phenomenon, other vehicles and traffic participants;
  meteorological data;
  environmental data;
  vehicle-to-vehicle communication; and
  environment-to-vehicle communication, and wherein the sensor system is maintained snow free by at least one of the following:
  heating the sensor system using a heating system of the vehicle; and
  cleaning the sensor system using a cleaning device of the vehicle.

5. The control system according to claim 4, wherein the controller is configured to consider prioritization information of the vehicle including at least one selected from the group consisting of: tire quality, tire type, type of drive, fuel level, battery level, and coverage area.

6. The control system according to claim 5, wherein the drivable surface area includes at least one selected from the group consisting of: a sidewalk, a building entrance/exit area, a parking area, and a garage/carport entrance/exit area.

* * * * *